Patented Nov. 8, 1949

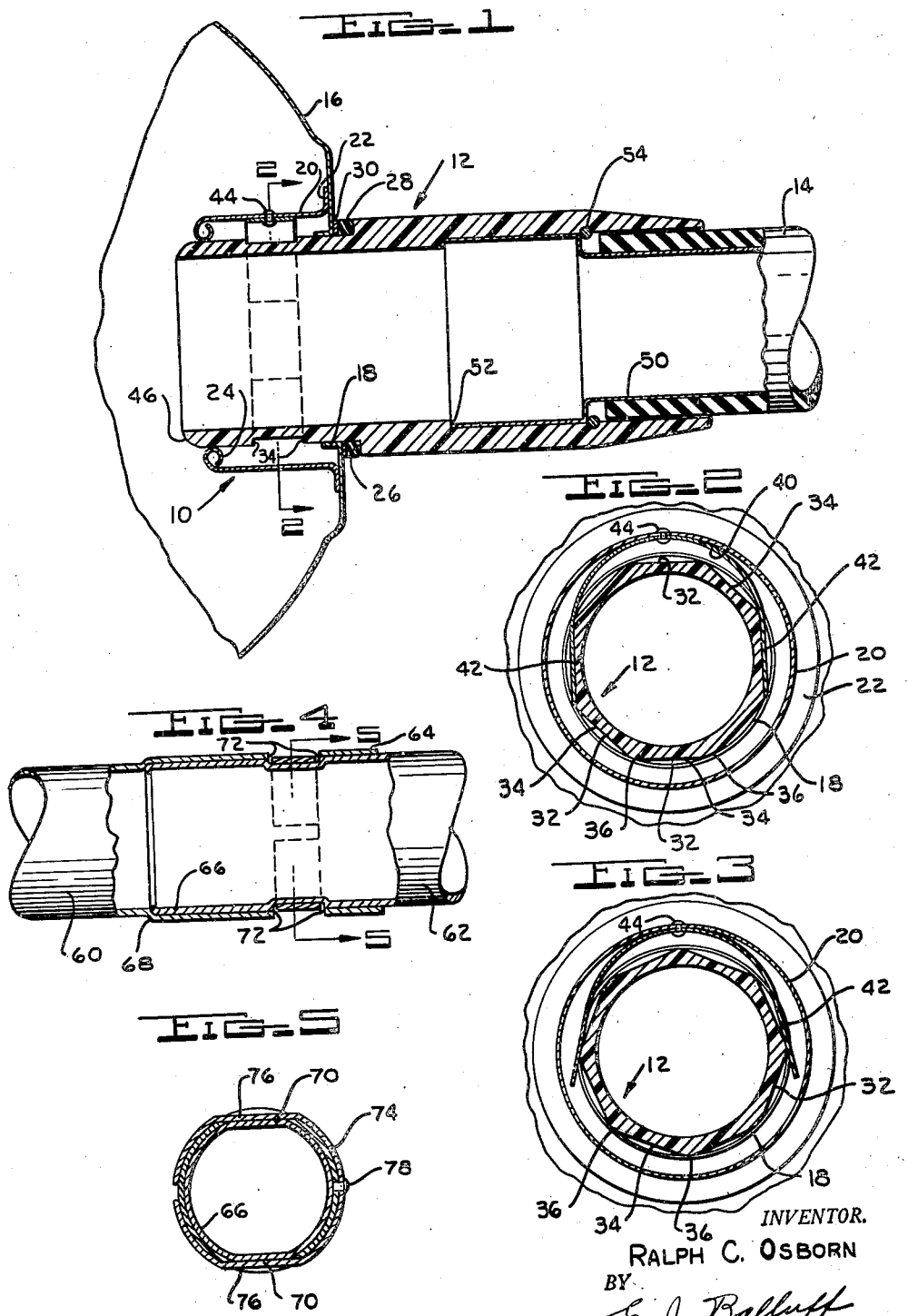

2,487,470

UNITED STATES PATENT OFFICE 2,487,470

QUICKLY DETACHABLE COUPLING FOR SUCTION CLEANERS

Ralph C. Osborn, Bloomington, Ill., assignor to Eureka Williams Corporation, Detroit, Mich., a corporation of Michigan Application June 15, 1946, Serial No. 676,986

4 Claims. (Cl. 285—174)

This invention relates to quickly detachable couplings for suction cleaners and has particular reference to a new and improved coupling member of this type which is simple in construction, dependable in operation, and extremely easy to couple and uncouple.

In suction cleaners of the tank type, cleaning tools are attached to one end of a flexible hose, the other end of which is detachably connected with the machine. In order to conveniently use the machine it is highly important that the coupling between the hose and the tank be easy to make and break. In the embodiments of the invention selected for purposes of illustration, readily attachable and detachable couplings for this and related purposes have been illustrated.

Principal objects of the invention therefore are to provide:

A new and improved readily detachable coupling for suction cleaners;

A readily detachable coupling which is simple in construction and dependable in operation.

Other and further objects of the invention will be apparent from the following description and claims and will be understood by reference to the accompanying drawings, of which there is one sheet, which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings:

Fig. 1 is a sectional view of a coupling embodying the invention illustrated in connection with the end bell of a tank type cleaner;

Fig. 2 is a cross sectional view taken along the line 2—2 of Fig. 1;

Fig. 3 is a view similar to Fig. 2 but showing the relationship of the parts of the coupling during the process of separating such parts;

Fig. 4 is a fragmentary sectional view of a modified form of the invention illustrating the application thereof to the ends of two wands for a suction cleaner; and Fig. 5 is a sectional view taken along the line 5—5 of Fig. 4.

As illustrated in Fig. 1, a quickly detachable coupling for suction cleaners comprises a socket coupling member 10 and a male coupling member 12. One end of a flexible air conducting hose 14 is swivelly connected to one end of the coupling member 12 while the other end of the coupling member is adapted to be inserted in the socket coupling member 10 and secured thereto, whereby the tank cleaner may be pulled around by means of the hose 14.

The socket coupling member 10 as illustrated is formed on the removable end bell 16 of the cleaner. The end bell 16 is provided with a circular hole or opening defined by a cylindrical flange 18. A sleeve or collar 20 is flanged outwardly at 22 at one end thereof, such flange being seated against the surface of the end bell outwardly of the flange 18 and suitably secured thereto such as by welding. The other end of the sleeve 20 is curled inwardly to form a bead 24, the internal diameter of which defines a circular hole or opening of the same diameter as that defined by the flange 18. The bead 24 and flange 18 form bearing means for receiving one end of the coupling member 12 and rotatably supporting the same relative to the end bell 16.

The inserted end of the coupling member 12 is reduced relative to the outwardly arranged portion thereof so as to define an annular shoulder 26 against which an annular rubber sealing ring 28 is arranged. An annular felt sealing ring 30 may be arranged next to the ring 28. The ring 30 forms a somewhat resilient stop for limiting the insertion of the male coupling member into the socket coupling member, and in addition the rings 28 and 30 function as sealing rings.

The inserted portion of the male coupling member may be provided with one or more flats 32 extending crosswise of the coupling member 10. In the present instance eight are shown, although it is contemplated that any other suitable or desired number may be employed. The flats 32 are formed by channels recessed in the periphery of the inserted end of the coupling member 12, the sides of the channels forming radially extending shoulders 34. In the present instance the flats 32 on the opposite sides of the coupling member are arranged parallel to each other and the distance between said flats is less than the diameter of the inserted end of the male coupling member, and consequently less than the diameter of the holes defined by the bead 24 and flange 18. The ends of the channels which define the flats terminate at 36 in the cylindrical surface of the inserted end of the male coupling member.

A U-shaped spring 40 is arranged inside the sleeve 20 in the space between the bead 24 and the flange 18 and includes two parallel legs 42. The spring 40 is suitably secured, such as by means of a rivet 44, in the position as illustrated and so that the legs 42 will straddle the inserted end of the male coupling member. The legs 42 are normally positioned a distance less than the diameter of the holes defined by the bead 24 and the flange 18 and less than the outside diameter of the inserted end of the coupling member 12.

The inserted end of the coupling member 12 is provided with a rounded edge 46 so that it may be inserted between the legs 42 and deflect the same outwardly in order to permit the coupling mmber 12 to be positioned in the socket 10 as illustrated in Fig. 1. When this is done any two of the channels defining the flats 32 which are arranged vertically will receive the legs 42 in the manner illustrated in Fig. 2. In order to make it possible for the user to readily align the flats 32 relative to the coupling member 10, the outside of the end bell and the outer surface of the coupling member 12 may be provided with markings which when aligned will position the flats 32 relative to the legs 42 of the spring as shown in Figs. 1 and 2. In this position the legs 42 of the spring will cooperate with the shoulders 34 to prevent relative axial movement of the coupling members 10 and 12. However, by relatively rotating the coupling members 10 and 12 so as to bring the same to the relative position as illustrated in Fig. 3, the legs 42 of the spring may be expanded as shown in Fig. 3 to the maximum diameter of the inserted end of the coupling member 12; that is, outwardly beyond the shoulders 34, whereupon the coupling member 12 may be separated by axial movement thereof from the coupling member 10.

Thus, to separate the coupling member 12 from the coupling member 10, it is necessary merely to turn the one relative to the other a relatively small amount, in the present instance 22½ degrees, and then to pull the coupling member 12 out of the socket 10. In order to engage the coupling members it is merely necessary to align the markings thereon as previously described and then simply to insert the coupling member 12 in the socket member 10.

The sleeve 50 secured in the end of the flexible hose 14 is arranged to swivel on the inside surface of the coupling member 12 and is secured against axial movement by means of the shoulder 52 and the snap ring 54.

In the embodiment of the invention illustrated in Figs. 4 and 5, a coupling member of the foregoing type is illustrated in connection with the cylindrical ends of two wands 60 and 62. The end of the wand 60 forms a socket coupling member 64, while the end of the wand 62 forms a male coupling member 66 which is slidably received within the socket coupling member 64. A shoulder 68 limits penetration of the coupling member 66 into the socket coupling member 64. The sides of the male coupling member 66 are provided with oppositely disposed, parallel arranged flats 70 which are spaced a distance less than the outside diameter of the coupling member 66. The flats 70 are formed by deforming portions of the coupling member 66 to the shape illustrated which in addition will form shoulders 72 at each side of the flats 70.

The socket coupling member 64 is provided with two oppositely arranged slots and a spring 74 is arranged so that the arms 76 thereof lie in such slots in a position to straddle the inserted end of the coupling member 66. The arms 76 are normally spaced a distance less than the outside diameter of the inserted end of the coupling member 66, and with the parts arranged as illustrated in Figs. 4 and 5, the arms 76 of the spring will cooperate with the flats 70 and the shoulders 72 to prevent axial separating movement of the coupling members 64 and 66. The spring 74 may be secured to the socket coupling member 64 by means of a rivet 78.

By relatively rotating the coupling members 64 and 66, the flats 70 may be moved out of alignment with the spring arms 76 whereby the coupling members may be axially separated. In order to engage the coupling members 64 and 66, the coupling member 66 is inserted in the socket coupling member 64 and turned if necessary to bring the flats 70 into alignment with the arms 76. The arms 76 cooperating with the flats 70 will tend to prevent accidental rotation of one of the wands relative to the other while permitting, however, the same to be manually relatively rotated in order to separate such wands.

While I have illustrated and described preferred embodiments of my invention, it is understood that these are capable of modification, and I therefore do not wish to be limited to the precise details set forth, but desire to avail myself of such changes and alterations as fall within the purview of the following claims.

I claim:

1. A quickly detachable coupling for suction cleaners comprising a socket coupling member comprising spaced circular portions defining peripherally aligned circular holes, a U-shaped spring between said spaced circular portions, said spring having legs arranged to straddle a male coupling member extending through said holes, said legs of said spring being generally parallel to each other and at a distance less than the diameter of said holes, a cylindrical male coupling member insertable in said holes of said socket member, said spaced portions of said socket member forming bearing means for rotatably supporting said male coupling member relative to said socket member, said male coupling member having parallel channels arranged on opposite sides thereof, the bottoms of said channels being spaced from each other a distance less than the diameter of said male coupling member so as to form radially extending shoulders projecting outwardly from opposite sides of said channels, said legs of said spring being arranged in said channels and cooperating with said shoulders to prevent relative axial movement of said coupling members, the ends of said channels terminating in the cylindrical surface of said male coupling member so that upon rotation of said male coupling member relative to said socket coupling member the shoulders of said male coupling member may be disengaged from said spring legs and said coupling members separated by relative axial movement.

2. A quickly detachable coupling for suction cleaners comprising a socket coupling member having a spring arranged therein, a cylindrical male coupling member insertable in said socket coupling member, said socket member having spaced and peripherally aligned bearing means for rotatably and slidably engaging said cylindrical surface for supporting said male coupling member relative to said socket member, said male coupling member having a transversely arranged channel on the periphery thereof, said channel having radially extending shoulders projecting outwardly from opposite sides thereof, said spring being arranged in said channel and cooperating with said shoulders to prevent relative axial movement of said coupling members, the ends of said channel terminating in the cylindrical surface of said male coupling member so that upon rotation of said male coupling member relative to said socket coupling member the shoulders of said male coupling member may be disengaged from said spring and said coupling members separated by relative axial movement.

3. A quickly detachable coupling for suction cleaners comprising a socket coupling member within said cleaner comprising spaced circular portions defining peripherally aligned circular holes, a spring having legs arranged in the space between said portions with the legs of said spring arranged to straddle a male coupling member extending through said holes, a cylindrical male coupling member insertable in said holes of said socket member, said spaced portions of said socket member forming bearing means for rotatably supporting said male coupling member relative to said socket member, said male coupling member having transverse channels arranged on the periphery thereof, said channels forming radially extending shoulders projecting outwardly from opposite sides of said channels, said legs of said spring being arranged in said channels and cooperating with said shoulders to prevent relative axial movement of said coupling members, the ends of said channels terminating in the cylindrical surface of said male coupling member so that upon rotation of said male coupling member relative to said socket coupling member the shoulders of said male coupling member may be disengaged from said spring legs and said coupling members separated by relative axial movement.

4. A quickly detachable coupling for suction cleaners comprising a sleeve forming a socket coupling member, said sleeve being provided with oppositely disposed arcuate openings formed circumferentially therein, a U-shaped spring associated with said coupling member with the legs of said spring disposed within said arcuate openings, a cylindrical coupling member disposed within said socket member, said cylindrical coupling member having channels formed in the periphery thereof opposite said openings in said socket coupling member, said channels forming in said coupling member radially extending shoulders projecting outwardly from opposite sides of said channels in alignment with opposite sides of said openings in said socket coupling member, said legs of said spring being adapted also to project within said channels for operatively engaging said shoulders and said edges of said openings to prevent relative axial movement of said coupling members, the ends of said channels terminating in the surface of said cylindrical coupling member so that upon rotation of said cylindrical coupling member relative to said socket coupling member, said shoulders of said cylindrical coupling member may be disengaged from said spring legs, whereby said coupling members may be separated by relative axial movement of one with respect to the other.

RALPH C. OSBORN.

REFERENCES CITED

The following references are of record in the file of this patent:

UNITED STATES PATENTS

| Number | Name | Date |
| --- | --- | --- |
| 459,951 | Warner | Sept. 22, 1891 |
| 1,543,356 | Arnold | June 23, 1925 |
| 2,365,574 | McWane | Dec. 19, 1944 |